(12) United States Patent
Ohayon (10) Patent No.: US 7,228,974 B2
(45) Date of Patent: Jun. 12, 2007

(54) MULTI-MEDIA STORAGE RACK

(76) Inventor: Abraham Ohayon, 1345 E. 38th St., Brooklyn, NY (US) 11234

( * ) Notice: Subject to any disclaimer, the term of this patent is extended or adjusted under 35 U.S.C. 154(b) by 497 days.

(21) Appl. No.: 10/903,284

(22) Filed: Jul. 29, 2004

(65) Prior Publication Data

US 2005/0082240 A1    Apr. 21, 2005

Related U.S. Application Data

(63) Continuation-in-part of application No. 10/861,754, filed on Jun. 3, 2004, and a continuation-in-part of application No. 29/191,943, filed on Oct. 15, 2003, now Pat. No. Des. 493,659.

(51) Int. Cl.
*A47G 29/00* (2006.01)

(52) U.S. Cl. .................................................. 211/40

(58) Field of Classification Search ............ 211/40, 211/41.12, 194, 188, 126.15, 151; 312/108, 312/348.3, 111; 220/552; 206/503, 509
See application file for complete search history.

(56) References Cited

U.S. PATENT DOCUMENTS

| | | | |
|---|---|---|---|
| 4,850,477 A | 7/1989 | Gelardi et al. | |
| 5,593,037 A | 1/1997 | Ohayon | |
| D380,639 S * | 7/1997 | Tisbo | D6/629 |
| D381,344 S | 7/1997 | Kosaku | |
| D382,405 S | 8/1997 | Ohayon | |
| 5,727,695 A * | 3/1998 | English, II | 211/40 |
| D404,956 S | 2/1999 | Cheris et al. | |
| D404,957 S | 2/1999 | Cheris et al. | |
| 5,873,472 A | 2/1999 | Weisburn | |
| 5,934,463 A * | 8/1999 | Yu | 206/307.1 |
| D425,703 S | 5/2000 | Ohayon | |
| 6,059,123 A * | 5/2000 | Cotutsca | 211/40 |
| 6,062,388 A | 5/2000 | Ohayon | |
| D443,790 S | 6/2001 | Bennett | |
| 6,340,086 B1 * | 1/2002 | McConnaughy et al. | 206/307.1 |
| D485,725 S | 1/2004 | Real | |
| D493,659 S | 8/2004 | Ohayon | |
| D509,982 S * | 9/2005 | Yang | D6/629 |

OTHER PUBLICATIONS

Related U.S. Appl. No. 10/861,754. filed Jun. 3, 2004; Inventor: Abraham Ohayon, Title: Stackable Bins and Storage Media Rack Therefor.

* cited by examiner

*Primary Examiner*—Sarah Purol
(74) *Attorney, Agent, or Firm*—Frishauf, Holtz, Goodman & Chick, P.C.

(57) ABSTRACT

Storage media rack arranged to simultaneously receive different sizes and types of storage media including front and rear walls, side walls, a bottom wall having steps which connect the bottom wall to the side walls and partition walls arranged perpendicular to the side walls and on the steps such that a first type of storage media can be positioned on or supported by the steps and a second type of storage media can be positioned on or supported by the bottom wall between the steps. Additional partition walls project inwardly from the steps and upwardly from the bottom wall and define slots for receiving the second type of storage media.

25 Claims, 11 Drawing Sheets

MULTI-MEDIA STORAGE RACK

CROSS-REFERENCE TO RELATED APPLICATIONS

This application is a continuation-in-part of U.S. patent application Ser. No. 10/861,754 filed Jun. 3, 2004 and U.S. patent application Ser. No. 29/191,943 filed Oct. 15, 2003, now U.S. Pat. No. Des. 493,659, the specifications of which are incorporated by reference herein.

FIELD OF THE INVENTION

The present invention relates generally to a storage media rack or tray which enables different sizes and types of storage media to be simultaneously accommodated in the bin.

The present also relates to stackable storage bins capable of receiving the storage media rack or tray.

BACKGROUND OF THE INVENTION

Stackable bins for holding articles are well known. For example, stackable bins have been proposed by the same inventor herein, and which are the subject matter of U.S. Pat. No. 5,593,037, issued Jan. 14, 1997, and U.S. Pat. No. 6,062,388, issued May 16, 2000, the entire disclosures of which are incorporated herein by reference.

According to the '037 patent, a stackable bin is provided having reinforcing ribs that perform a two-fold function of reinforcing the walls while also supporting the bin in a stacked arrangement, and in which there is a reliable interlocking arrangement of the bins in the stacked configuration thereof. The bins proposed in the '037 patent have a central partition wall which supports the bins in a stacked relation, divides each bin into two compartments, increases the structural integrity of each bin and locks the bins in a stacked relation. A problem occurs, however, if the bins have a small dimension without the central partition wall. Specifically, inner pressure from the goods in a stacked bin may cause the front ends of the side walls of the bin to move outwardly. This, in turn, can cause instability in the top bin, since the bottom of the top bin stacked thereon could fall down within the side walls of the lower bin.

According to the '388 patent, a stackable bin is provided which includes two spaced apart side walls and a rear wall having opposite side edges connecting rear edges of the side walls together. The side and rear walls are slightly inclined inwardly with respect to a vertical plane such that lower edges of the side and rear wall fit within upper edges of side and rear walls of a lower stackable bin. A bottom wall is connected to lower portions of the side and rear walls. Vertically oriented ribs are arranged on outer surfaces adjacent front and rear edges of the side walls for supporting the stackable bin on the upper edges of the side walls of the lower bin and for increasing structural rigidity of the side walls. At least some ribs include a notch in a lower end to receive the upper edges of the side walls of the lower bin and an outer interlocking tab at a lower end which engages outer surfaces of the side walls of the lower bin when the upper edges of the side walls of the lower bin are received in the notches. In this manner, the side walls of the lower bin are maintained in alignment and outward movement thereof is prevented.

The stackable bins in the '037 patent and the '388 patent generally do not enable easy variations in the size of the object-containing receptacle.

SUMMARY OF THE INVENTION

It is an object of the invention to provide a storage media tray which is capable of simultaneously retaining different sizes and types of storage media.

Another object of the present invention is to enable different configurations of a stackable bin using a storage media tray capable of simultaneously retaining different sizes and types of storage media.

In order to achieve one or more of these objects and other objects, one embodiment of a storage media rack in accordance with the invention which is arranged to simultaneously receive different sizes and types of storage media comprises front and rear walls, side walls, a bottom wall having steps which connect the bottom wall to the side walls and first partition walls arranged perpendicular to the side walls and on the steps such that a first type of storage media can be stored on the steps and a second type of storage media can be stored on the bottom wall between the steps.

Second partition walls can project inwardly from the steps and upwardly from the bottom wall to accommodate the second type of storage media therebetween. The second partition walls include side faces having indentations spaced a distance from the bottom wall and from a vertical leg of the steps such that additional types of storage media can be positioned on or supported by the indentations. The location and depth of the indentations is determined by the type of storage media sought to be able to be stored using the storage media rack.

The first partition walls can be provided in a storage media rack without the second partition walls and vice versa.

One embodiment of a stackable bin in accordance with the invention which is capable of accommodating the storage media rack described above comprises a case including a bottom wall, a top wall and a support mechanism for supporting the top wall at a distance from the bottom wall to thereby define a slot. A drawer is insertable into the slot and defines a receptacle capable of receiving objects for storage. A partitioning structure is also provided for partitioning the receptacle into smaller compartments.

The support mechanism may be connected at a lower end to the bottom wall of the case and at an upper end to the top wall of the case. Each support may include a side wall having vertically extending ribs. A step is formed at an upper end to provide a channel receivable of a lip of the drawer.

To enable stacking of a plurality of the bins on top of one another, a peripheral rib is formed on a bottom surface of the bottom wall of the case and a peripheral rib formed on an upper surface of the top wall of the case and offset from the peripheral rib on the bottom wall. These peripheral ribs serve to align the bins in a vertical configuration to form a stable stack of bins.

The drawer includes opposed front and rear walls, opposed side walls and a bottom wall connected to a lower edge of the front, rear and side walls. To guide insertion of the drawer into the slot, drawer guide ribs may be arranged on an upper surface of the bottom wall of the case and cooperating guide ribs are arranged on a bottom surface of the bottom wall of the drawer. To limit insertion of the drawer into the slot, a rib may be formed on the bottom wall of the drawer below the front wall and a stop formed on the bottom wall of the case.

The partitioning structure may comprise divider guides arranged on opposed interior surfaces of the drawer and dividers removably insertable between the dividers. More specifically, the divider guides include a first set of divider guides arranged on the front and rear walls of the drawer and a second set of divider guides arranged on the side walls of the drawer. The dividers include a first set of at least one divider insertable into opposed divider guides in the first set of divider guides and a second set of at least one divider insertable into opposed divider guides in the second set of divider guides. Each divider in the first set partitions the receptacle lengthwise and includes a first slot extending upward from a bottom surface and at a location in alignment with opposed divider guides in the second set of divider guides and a pair of upper guide members spaced apart from one another at a top of the divider and which define a channel aligning with the first slot. Each divider in the second set partitions the receptacle crosswise and includes a second slot extending downward from an upper surface and at a location in alignment with opposed divider guides in the first set of divider guides and a pair of lower guide members spaced apart from one another at a bottom of the divider and which define a channel aligning with the second slot. Each divider guide may comprise a pair of vertically extending ribs spaced apart a distance equal to the width of a compatible divider.

Another embodiment of a stackable bin in accordance with the invention which is capable of receiving the storage media rack comprises a case including a bottom wall, a top wall and a support mechanism for supporting the top wall at a distance from the bottom wall to thereby define a slot. A drawer is insertable into the slot and defines a receptacle capable of receiving objects for storage. The storage media rack is insertable into the receptacle in the drawer and arranged to simultaneously receive different sizes and types of storage media. The storage media rack includes front and rear walls, side walls and a bottom wall having steps which connect the bottom wall to the side walls. Partition walls are arranged on the storage media rack perpendicular to the side walls on the steps such that a first type of storage media is positionable on the steps. Additional partition walls project inwardly from the steps and upwardly from the bottom wall and including side faces having indentations spaced a distance from the bottom wall and from a vertical leg of the steps such that additional types of storage media are positionable on the indentations.

A stackable bin in accordance with the invention can accommodate both the storage media rack and the partitioning structure described above, although both cannot be used simultaneously. However, since both are removable from the receptacle, they can be packaged and sold together with the case and the user would be able to chose which way to use the bin. Also, the user could pick which dividers to insert into the divider guides in the drawer and thereby be able to partition the receptacle into various configurations of smaller compartments.

The above-mentioned objects and other objects of the present invention are attained in accordance with the storage media rack and stackable bin configuration of the present invention which is described hereinafter.

BRIEF DESCRIPTION OF THE DRAWINGS

The invention, together with further objects and advantages thereof, may best be understood by reference to the following description taken in conjunction with the accompanying drawings, wherein like reference numerals identify like elements.

DETAILED DESCRIPTION OF THE INVENTION

Figure 1:
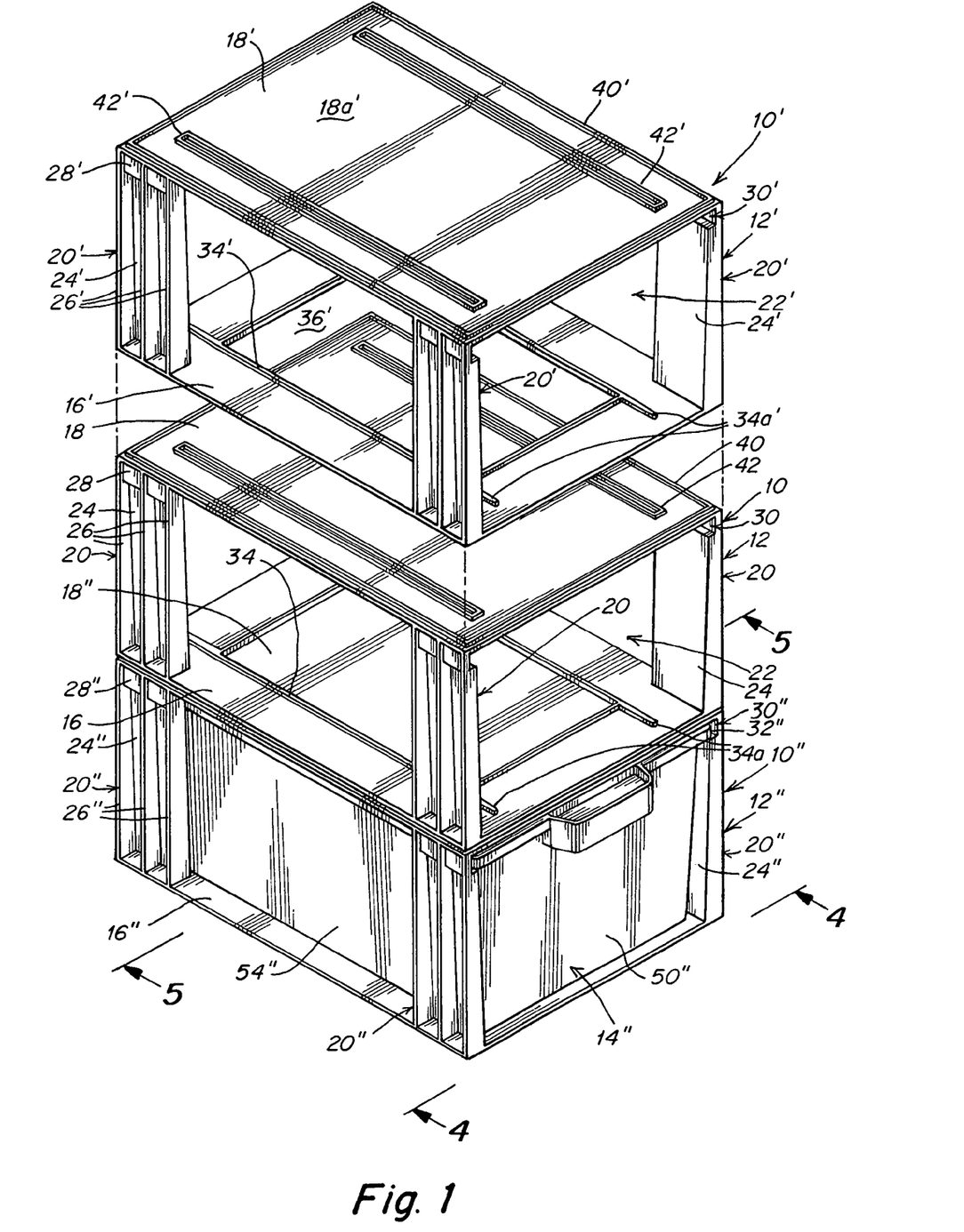
FIG. 1 is an exploded perspective view of a stacked group of stackable bins according to the present invention wherein only the lower bin is shown with a drawer.

Referring to the accompanying drawings wherein like reference numerals refer to the same or similar elements, FIGS. 1–8 show a stackable bin 10 according to the present invention. The bin 10 is formed as a multi-piece construction in which the basic bin 10 includes a case 12 and a drawer 14. Since the present invention will be described with reference to bins that are stackable, the notation to be used hereinafter refers to a prime (') after a numeral to represent the top one of a group of three stacked bins 10, a double prime (") after a numeral to represent the bottom one of the three stacked bins and a numeral by itself to represent the center bin of the three stacked bins and to describe the parts of a single bin in general. Also, the longitudinal direction of the bins 10 will be considered a direction perpendicular to the front and rear faces of the bins 10 (parallel to the lateral or side faces of the bin 10) whereas the lateral direction will be considered a direction perpendicular to the lateral or side faces of the bins (parallel to the front and rear faces of the bins). FIG. 1 thus shows the group of three stacked bins 10, 10' and 10".

The case 12 is formed as a homogeneous, uniform and one piece plastic material. Case 12 includes a substantially planar bottom wall 16, a substantially planar top wall 18 and vertical supports 20 arranged at each corner between the bottom and top walls 16,18. Supports 20 are connected to the bottom wall 16 and the top wall 18 and thereby support the top wall 18 at a distance from the bottom wall 16 to define a slot 22 in which the drawer 14 slides. Although as shown the bottom wall 16 and top wall 18 have a generally rectangular configuration, the present invention is not limited to this particular configuration.

Each support 20 includes a side wall 24 and a plurality of vertically extending ribs 26 arranged on the side wall 24 (three in the illustrated embodiment although the number may vary for different sized bins and even for different supports in the same bin). The side wall 24 has a step 28 formed at its upper end to provide a channel 30 in which a lip 32 of the drawer 14 passes (see FIG. 5).

The case 12 can be used with or without a drawer 14 (i.e., as shown in FIG. 1, bin 10″ includes a drawer 14 in the case 12, whereas bins 10 and 10″ include only a case 12). When used with a drawer 14, the drawer 14 provides the storage capability. When used without the drawer 14, items can be placed directly into the slot 22 and support on the bottom wall 16 (and possibly on the top wall of 18 of an underlying bin).

To enable a plurality of bins 10 to be stacked on top of one another in a secure manner and in alignment with one another, the bottom wall 16 includes a rib 38 formed on a lower surface 16a thereof and extending around its periphery while the top wall 18 includes a cooperating or mating rib 40 formed on the upper surface 18a thereof and extending around its periphery. In the illustrated embodiment, the bottom peripheral rib 38 extends inward of the top peripheral rib 40 although the relative position may be the opposite. When multiple bins 10, 10′ are stacked on top of one another, the peripheral ribs 38, 40 align the bins 10, 10′ so that bin 10′ is entirely atop bin 10 thereby providing a stable stack. Specifically, the top peripheral rib 40 on bin 10 is arranged entirely around the bottom peripheral rib 38 on the bin 10′. The peripheral ribs 38,40 may be designed to contact one another to enhance the securing of an upper bin 10′ to an underlying bin 10.

Stiffener ribs 42 may be formed on the upper surface 18a of the top wall 18 of each bin 10 to assist in the support of an overlying bin 10′. The stiffener ribs 42 extend longitudinally and can be positioned to provide support for the drawer 14 in the overlying bin 10′, i.e., be positioned at a location which will be under a drawer 14 of the overlying bin 10′. Stiffener ribs 42 may be rectangular as shown or have a different configuration. Furthermore, one or more reinforcing ribs may be formed on the upper surface 18a of the top wall 18 of the bin 10. For example, a rectangular reinforcing rib may be formed with one portion parallel each side of the bin 10, with the stiffener ribs 42 being arranged inward of this optional, additional reinforcing rib.

The drawer 14 can take various forms. In the non-limiting illustrated embodiment, the drawer 14 includes opposed front and rear walls 50, 52, opposed side walls 54, 56 and a bottom wall 58 defining a receptacle 60 capable of receiving any type of consumer article, whether packaged or loose.

To guide movement of the drawer 14 in the slot 22, drawer guide ribs 34 are formed on the bottom wall 16 of the case 12 extending from a forward region of the bottom wall 16 to a rear region of the bottom wall 16 and the bottom wall 58 of the drawer 14 includes longitudinally extending cooperating or mating guide ribs 64 formed on the bottom surface. The guide ribs 64 cooperate with the drawer guide ribs 34 and thereby guide the insertion of the drawer 14 into the slot 22 and removal therefrom (see FIG. 8). Instead of drawer guide ribs 34 and cooperating guide ribs 64, other mechanisms for guiding the insertion of the drawer 14 into the slot 22 and removal of the drawer 14 from the slot 22 can be used in the invention.

Drawer guide ribs 34 are shown parallel to one another and extend longitudinally along the bottom wall 16. In the illustrated embodiment, the bottom wall 16 includes an opening 36 between the drawer guide ribs 34. However, the bottom wall 16 may also be solid.

A mechanism is provided to limit the movement of the drawer 14 into the slot 22. Specifically, the bottom wall 58 includes a rib 62 extending downward from the bottom surface and formed below the front wall 52 to thereby act as a stop when the drawer 14 is inserted into the slot 22. This serves to limit the inward movement of the drawer 14 into the slot 22 in the case 12 to a position in which the front and rear walls 50, 52 are entirely within the case 12. To this end, a forward portion 34a of the drawer guide ribs 34 acts a stop which is contacted by the rib 62 upon complete insertion of the drawer 14 into the slot 22. Other mechanism for limiting the movement of the drawer 14 into the slot 22 can also be used in accordance with the invention.

Figure 4:
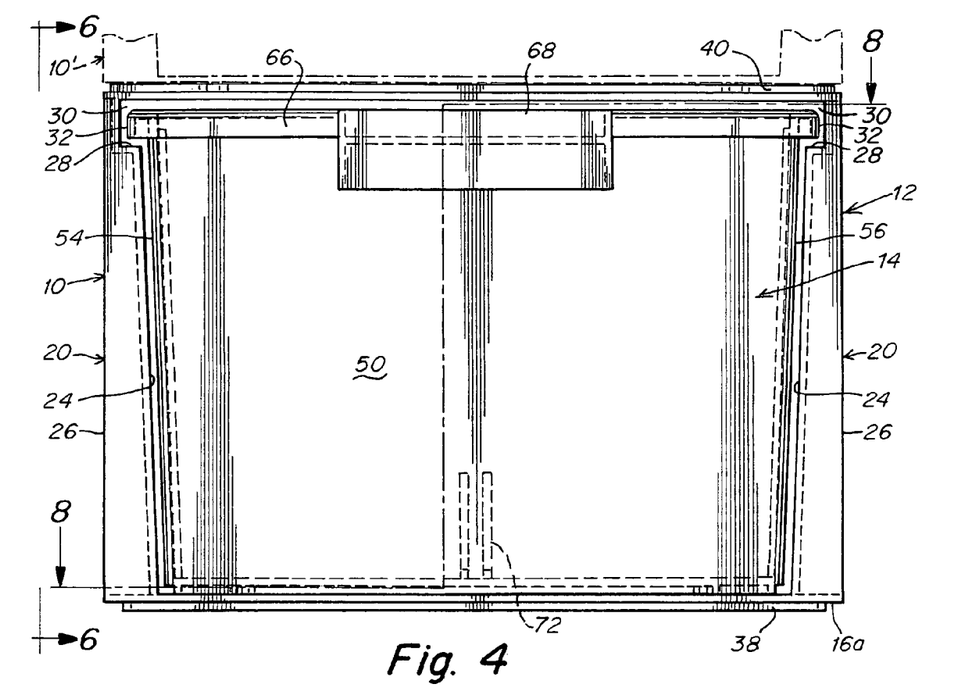
FIG. 4 is a front elevational view of the bin including the drawer as seen along the line 4—4 of FIG. 1.
Figure 5:
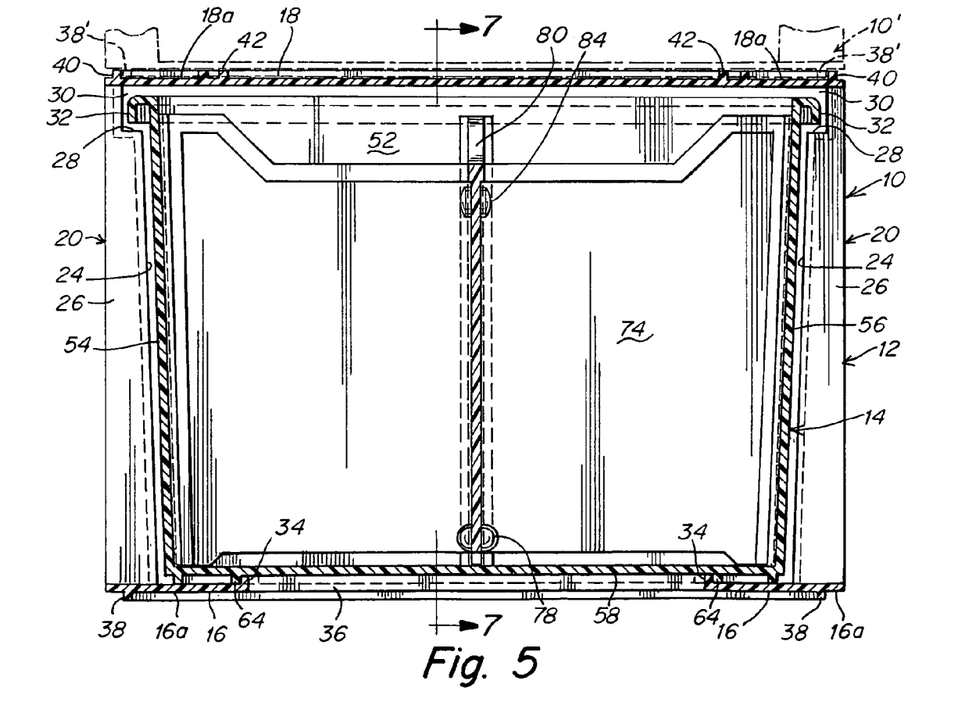
FIG. 5 is a cross-sectional front view of the bin including the drawer taken along the line 5—5 of FIG. 1.
Figure 6:
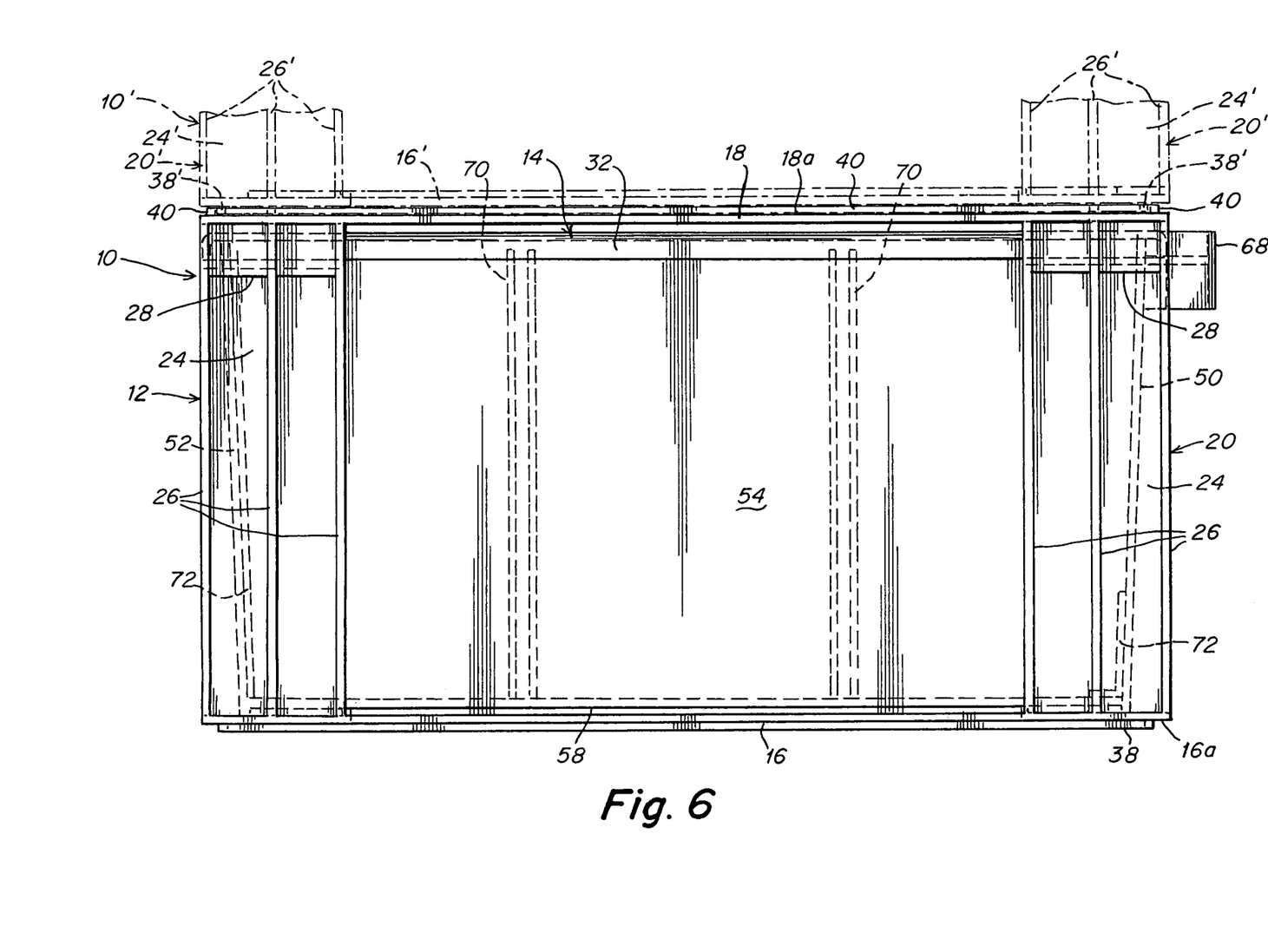
FIG. 6 is a side elevational view of the bin including the drawer as seen along the line 6—6 of FIG. 4.
Figure 7:
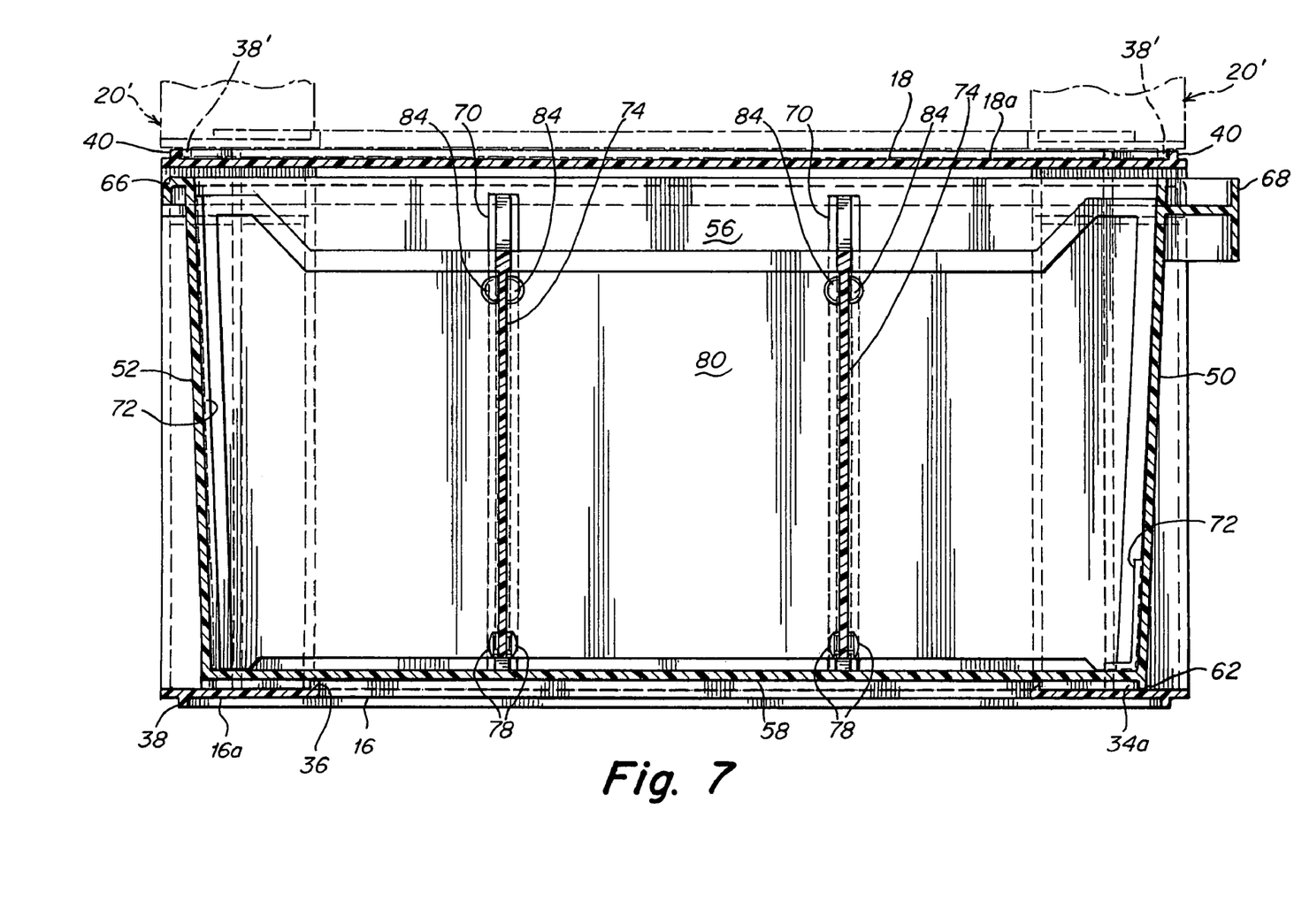
FIG. 7 is a cross-sectional side view of the bin including the drawer taken along the line 7—7 of FIG. 4.
Figure 8:
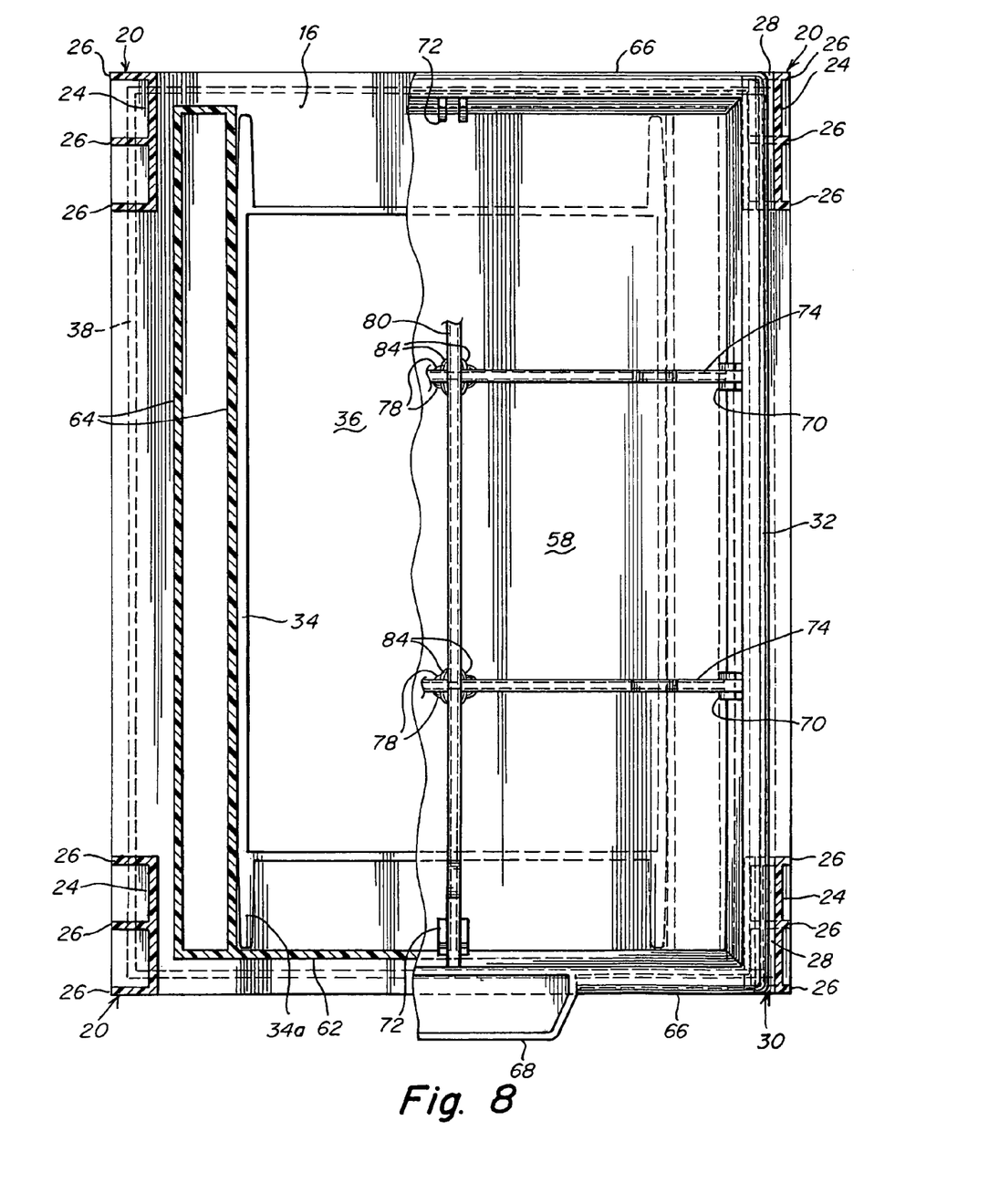
FIG. 8 is a cross-sectional plan view of the bin including the drawer taken along the line 8—8 of FIG. 4.

The upper edge of each of the side walls 54, 56 include lips 32 which are designed to pass into the steps 28 formed in the supports 20 (see FIGS. 4 and 5). A lip 66 is also provided along the upper edge of each of the front and rear walls 50, 52. A handle 68 projects forward from the front wall 50.

Figure 2:
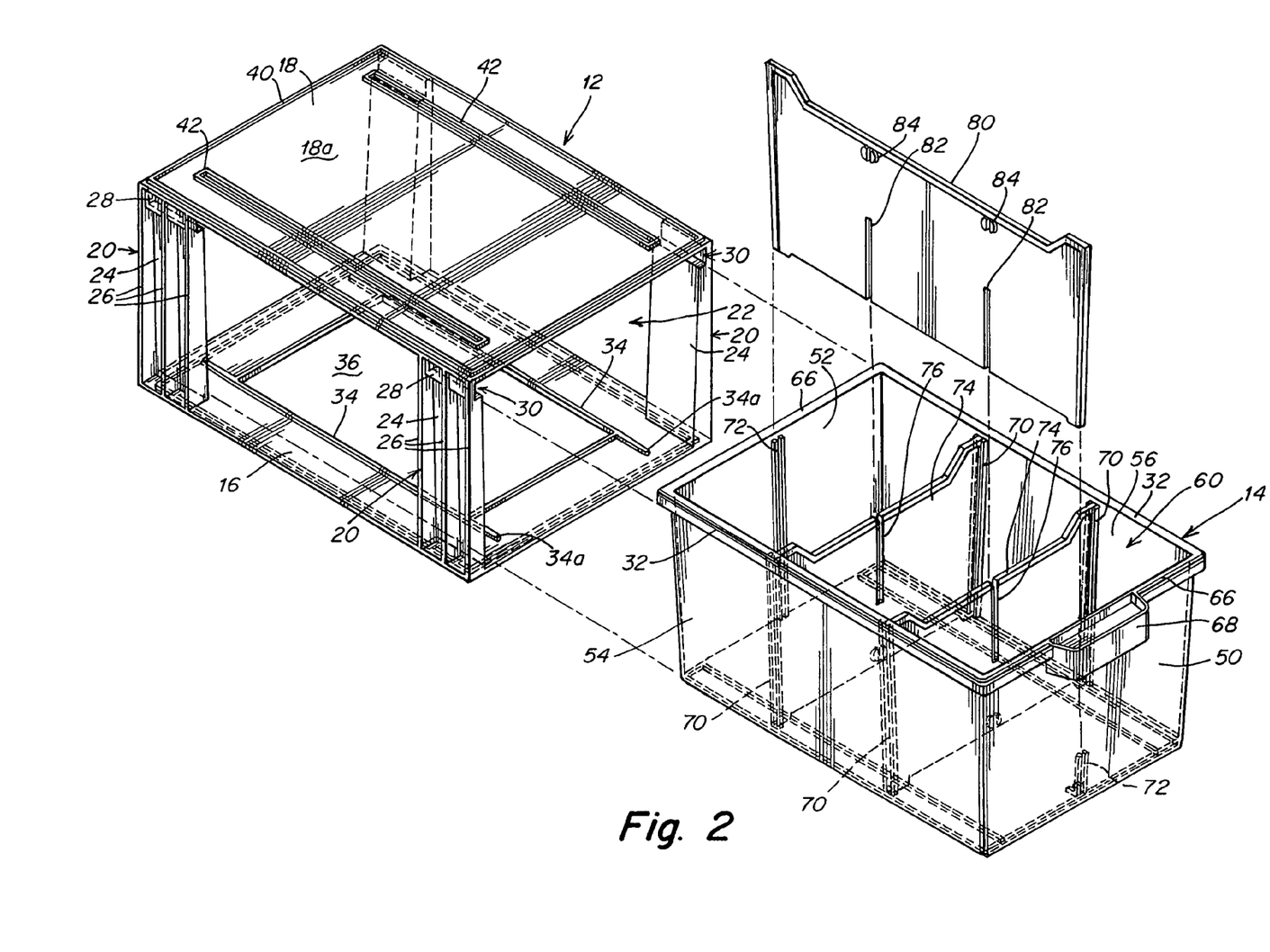
FIG. 2 is an exploded perspective view of a single bin including a drawer.
Figure 3:
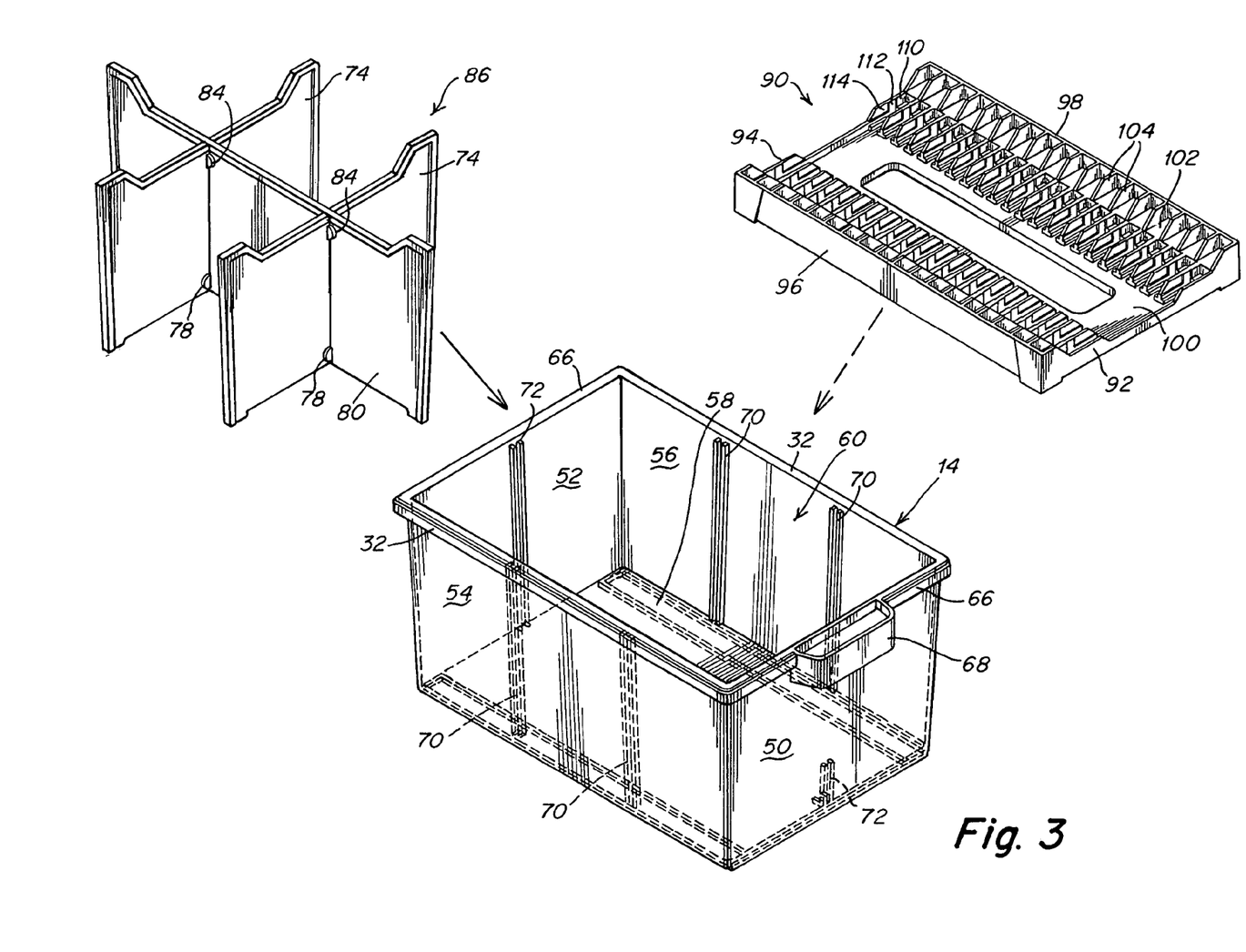
FIG. 3 is an exploded perspective view of a drawer showing possible insertions.

The inner surfaces of the front and rear walls 50, 52 and side walls 54, 56 and the upper surface of the bottom wall 58 are designed to securely mate with a variety of different partitions which enable the receptacle to be divided into various configurations of smaller size receptacles. To this end, as shown in FIGS. 2 and 3, two divider guides 70 are arranged on the inner surface of each of the side walls 54, 56 and in opposed relationship to the divider guides 70 on the opposite side wall 54, 56. Similarly, a divider guide 72 is arranged on the inner surface of each of the front and rear walls 50, 52 and in opposed relationship to one another. Each divider guide 70, 72 may be formed from a pair of vertically extending ribs spaced apart a distance equal to the width of a compatible divider.

Dividers 74 are designed to slide into a pair of opposed divider guides 70 in the side walls 54, 56 to partition the receptacle 60 crosswise. Crosswise dividers 74 each include a slot 76 extending from the upper surface and at a location in alignment with the divider guides 72 when the divider 74 is placed in the receptacle 60. Each divider 74 also includes a pair of lower guide members 78 spaced apart from one another at a bottom of the divider 74 (on one or both surfaces of the divider 74). The lower guide members 78 define a channel aligning with the slot 76, the purpose of which is explained below.

A divider 80 is designed to slide into the pair of opposed divider guides 72 in the front and rear walls 50, 52 to partition the receptacle 60 lengthwise. Lengthwise divider 80 includes a slot 82 extending upward from the bottom surface and at a location in alignment with the divider guides 70 in the side walls 54, 56 when the divider 80 is placed in the drawer 14. Lengthwise divider 80 also includes a pair of upper guide members 84 spaced apart from one another at a top of the divider 80 (on one or both surfaces of the divider 80). The upper guide members 84 define a channel aligning with the slot 82.

By providing the dividers 74, 80 with the respective slots 76, 82, the dividers 74, 80 can be mated to another (see the assembled partition structure 86 shown in FIGS. 2 and 3) and can both be placed in the receptacle 60 at the same time. Specifically, the slot 76 in divider 74 receives a portion of the divider 80 above the slot 82 whereas slot 82 in divider 80 receives a portion of the divider 74 below the slot 76. Also, to secure the coupling of the dividers 74, 80 together, the divider 80 also passes into the channel between the lower guide members 78 whereas the dividers 74 pass into a respective channel between the upper guide members 84 (see FIGS. 5 and 7).

If two crosswise dividers 74 and a lengthwise divider 80 are provided in a kit with the drawer 14, then there are numerous ways to partition the receptacle 60 in the drawer 14 into smaller compartments. Specifically, the drawer 14 can have a configuration wherein a single divider 74 is used and slid into one set of the divider guides 70 with or without divider 80 slid into the divider guides 72 in the front and rear walls 50,52, another configuration in which two dividers 74 are used and each slid into a respective set of divider guides 70 with or without divider 80 and another configuration in which only divider 78 is slid into the divider guides 72 in the front and rear walls 50,52. Although only two crosswise dividers 74, a single lengthwise divider 80 and the corresponding two sets of divider guides 70 on the side walls 54, 56 and single set of divider guides 72 on the front and rear walls 50, 52 are shown in the illustrated embodiment, the number of dividers 74, 80 and corresponding sets of divider guides 70,72 can be varied as desired in which case, the slots 76, 82 and guide members 78, 84 of the dividers 74, 82 would be dimensioned and positioned to mate with one another in the same manner as described above.

Referring now in particular to FIGS. 9–15, instead of placing dividers 74, 80 in the receptacle 60 defined in the drawer 14, it is alternatively possible to place a storage media rack 90 in the receptacle. Storage media rack 90 is formed as a one piece construction of plastic and is designed to simultaneously accommodate different sizes and types of storage media. The storage media rack can be used independent of the stackable bin 10 described above.

The storage media rack 90 includes front and rear walls 92, 94, side walls 96, 98 and a bottom wall 100. The front and rear walls 92, 94 are spaced apart a distance about equal to the distance between the divider guides 72 and the side walls 96, 98 are spaced apart a distance about equal to the distance between the divider guides 70 so that the storage media rack 90 fits securely into the receptacle 60 (see FIG. 9). Further, a portion 92a, 94a, 96a, 98a of the front and/or rear walls 92, 94 and/or side walls 96, 98 proximate the corners can have a larger thickness than a remaining portion of the respective wall 92, 94, 96, 98 to assist in the secure fit of the storage media rack 90 into the receptacle 60.

The bottom wall 100 includes an elongate aperture 126 with a circumferential, downwardly extending lip 128 which aids in the placement of the storage media rack 90 in the bins 10.

Steps 102 are provided to connect the bottom wall 100 to the side walls 96, 98. Partition walls 104 are arranged perpendicular to the side walls 96, 98 on the steps 102 and serve to partition the steps 102. The partitioning of the steps 102 is designed to allow the storage media rack to accommodate a first type of storage media such as a DVD case 106, when placed on its side (shown in dotted lines in FIG. 10). The DVD case 106 would thus rest on the steps 102 above the bottom wall 100. Another type of storage media can be placed between the steps 102.

Figure 9:
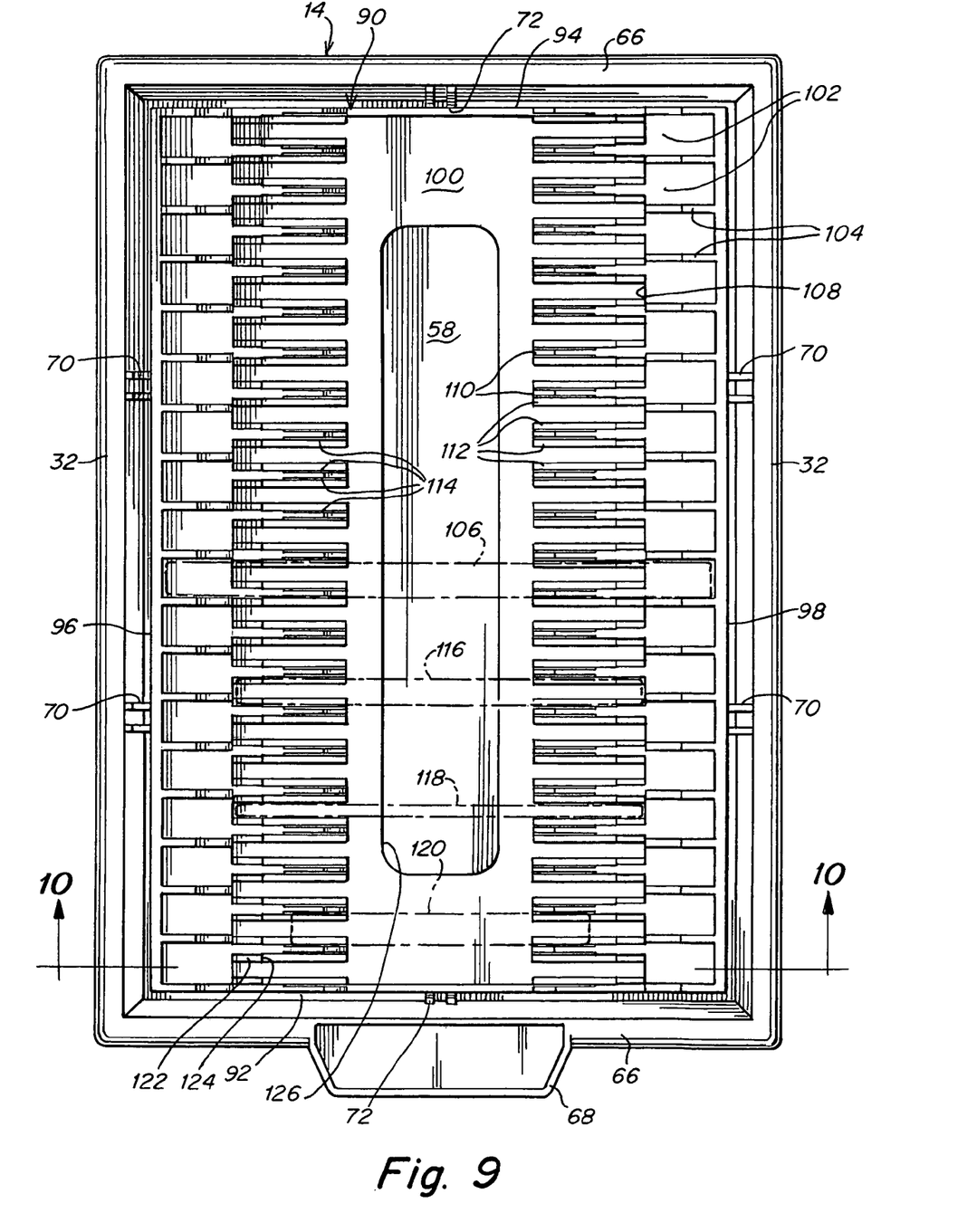
FIG. 9 is a top plan view of a drawer by itself with a storage media rack.
Figure 10:
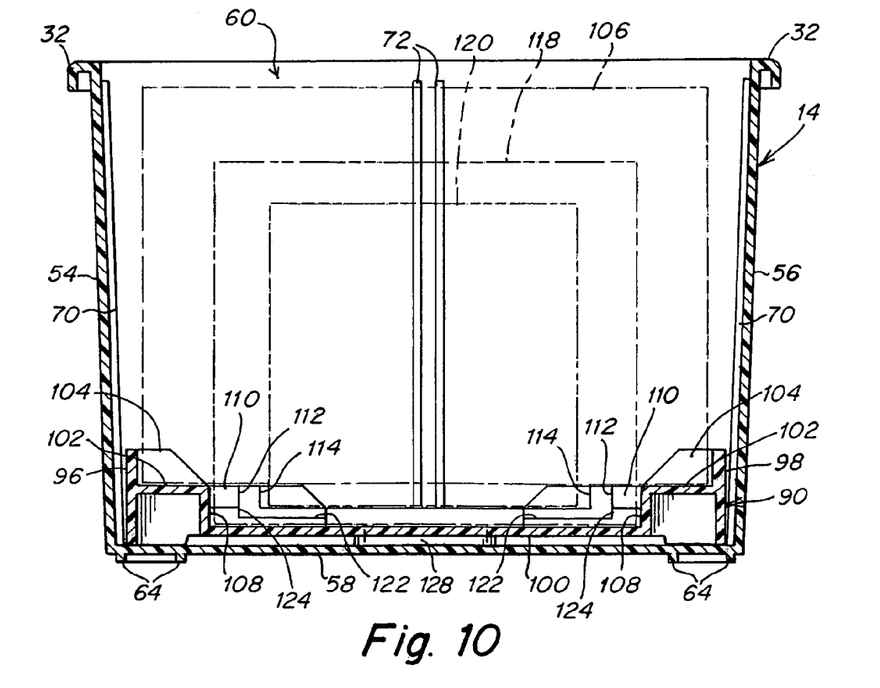
FIG. 10 is a cross-sectional front view taken along the line 10—10 of FIG. 9.
Figure 11:
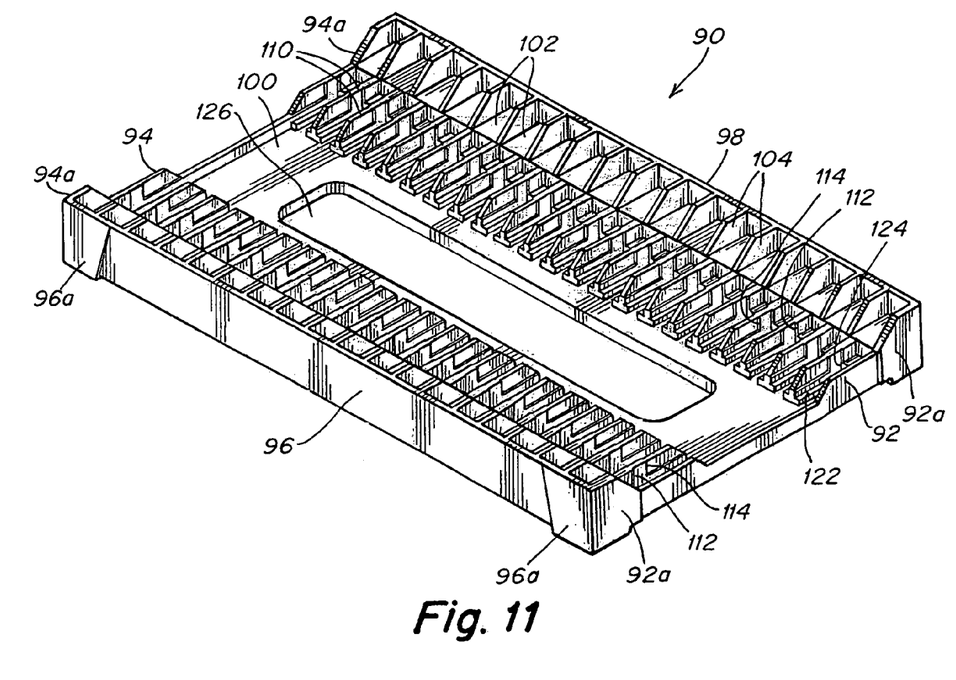
FIG. 11 is a top, front, left side perspective view of the storage media rack.
Figure 12:
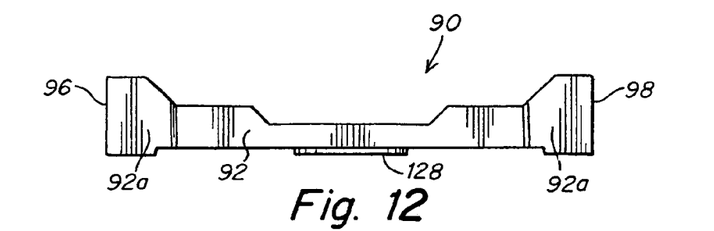
FIG. 12 is a front elevational view of the storage media rack shown in FIG. 11.
Figure 13:
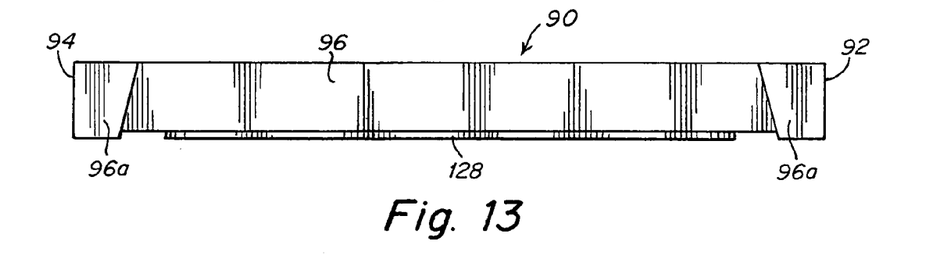
FIG. 13 is a left side elevational view of the storage media rack shown in FIG. 11.
Figure 14:
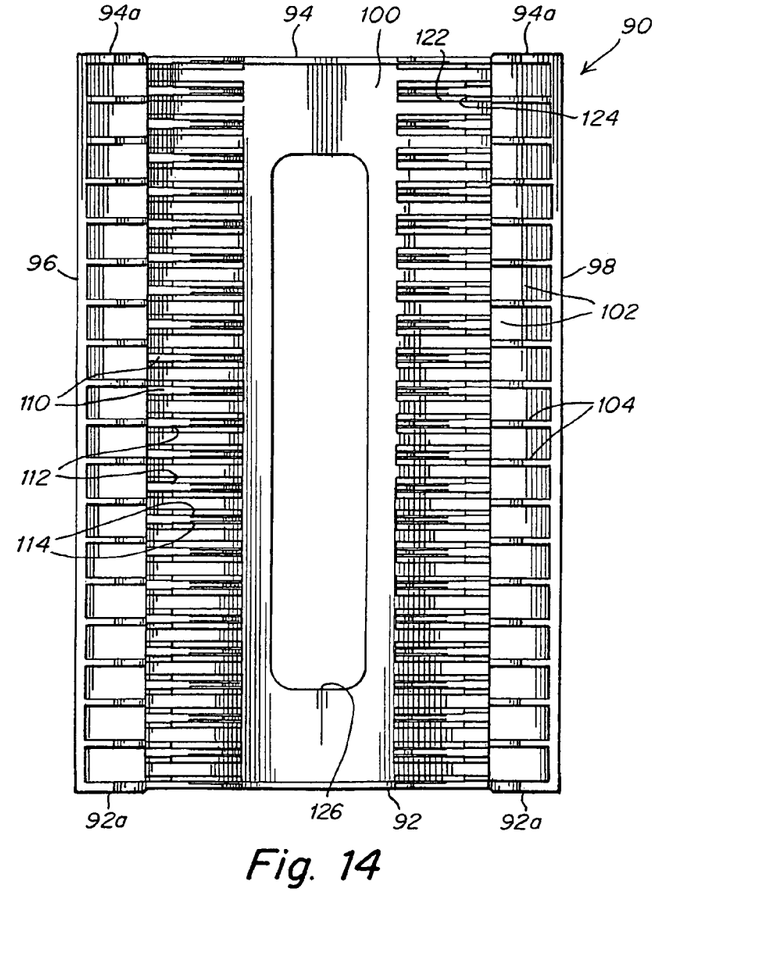
FIG. 14 is a top plan view of the storage media rack shown in FIG. 11.
Figure 15:
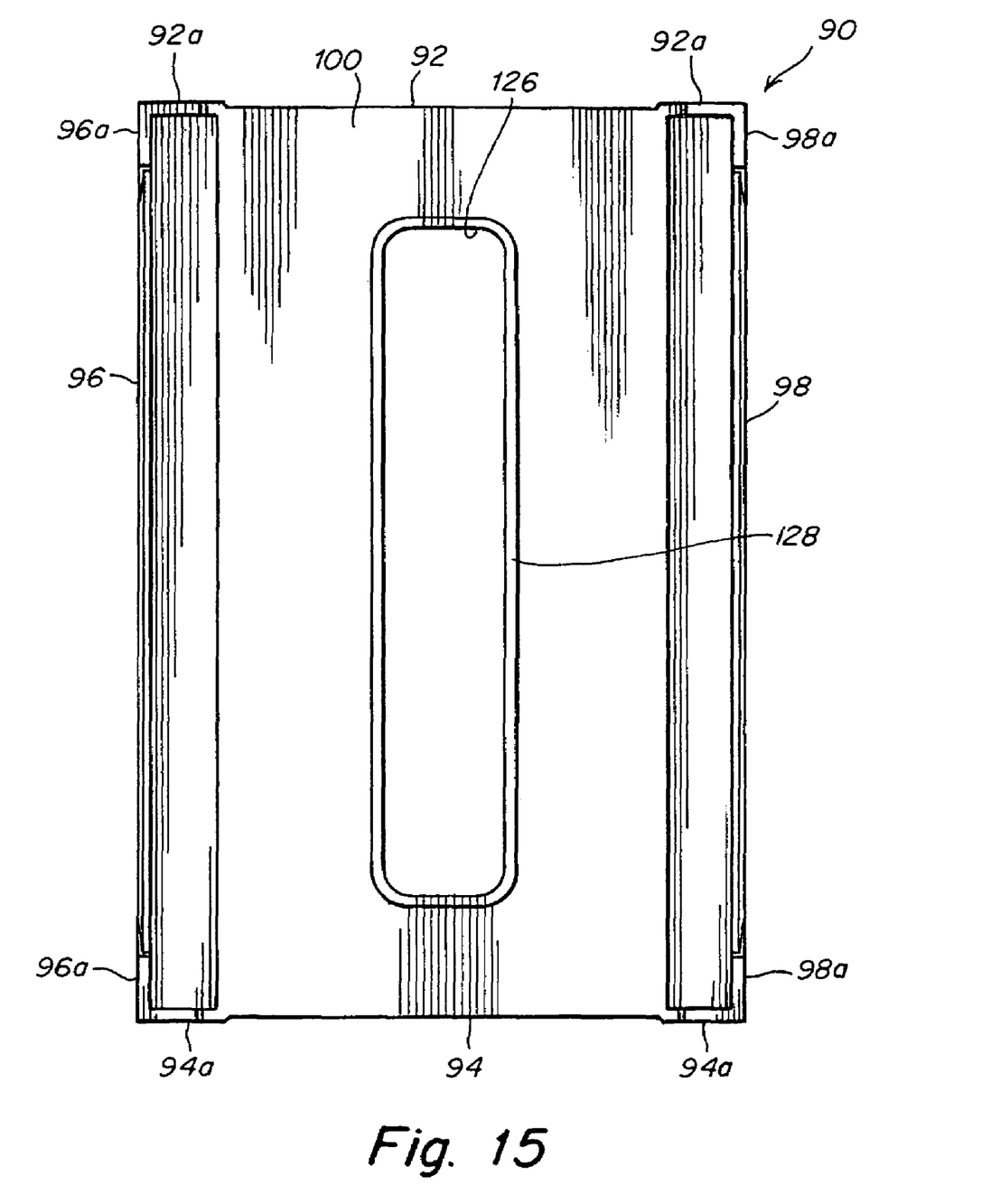
FIG. 15 is a bottom plan view of the storage media rack shown in FIG. 11.

To accommodate additional types of storage media, additional partition walls 110 project inwardly from the steps 102 and upwardly from the bottom wall 100 (see FIGS. 10, 11 and 14). Partition walls 110 do not align with the partition walls 104 as shown in FIGS. 9 and 14. The side faces of the partition walls 110, as well as the inner side face of the front and rear walls 92, 94 include indentations 112, 114 with each indentation 112, 114 being spaced a distance from the bottom wall 100 and spaced a distance from the vertical leg 108 of the step 102 (see FIG. 10). Along each partition walls 104 and the front and rear walls 92, 94, there is a bi-level platform 122. The lower level of the platform 122 and a vertical riser 124 between the two levels aligns with the indentation 112 (see FIGS. 10 and 14)

By providing the indentations 112, 114 in the partition walls 110, it becomes possible to securely store different sizes of CDs including a "thick" CD 116 and a "thin" CD 118 (shown in dotted lines in FIG. 9) as well as a cartridge 120 for a game system such as the GAMECUBE(™) or XBOX(™) system. Specifically, the "thin" CDs 118 would be received between a pair of opposed partition walls 110 (or between one partition wall 110 and the front or rear wall 92, 94) and the "thick" CDs 116 could be received between opposed indentations 112. The game cartridge 120 could be received between opposed indentations 114. As such, the storage media rack 90 could simultaneously store different types of storage media.

While particular embodiments of the invention have been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

I claim:

1. A storage media rack arranged to simultaneously receive different sizes and types of storage media, comprising:
   front and rear walls;
   side walls;
   a bottom wall having steps which connect said bottom wall to said side walls; and
   first partition walls arranged perpendicular to said side walls and on said steps whereby a first type of storage media is positionable on said steps and a second type of storage media is positionable on said bottom wall between said steps.

2. The storage media rack of claim 1, further comprising second partition walls projecting inwardly from said steps and upwardly from said bottom wall.

3. The storage media rack of claim 2, wherein said second partition walls include side faces having indentations spaced a distance from said bottom wall and from a vertical leg of said steps such that additional types of storage media are positionable on said indentations.

4. The storage media rack of claim 2, wherein said second partition walls include side faces having a first indentation spaced a first distance from said bottom wall and from a vertical leg of said steps and a second indentation spaced a second, larger distance from said bottom wall and said vertical leg such that additional types of storage media are positionable on said indentations.

5. The storage media rack of claim 4, further comprising a bi-level platform alongside each side of each of said second partition walls and alongside an inner face of said front and rear walls.

6. The storage media rack of claim 5, wherein for each of said platforms, a lower level of said platform and a vertical riser between the two levels aligns with a respective one of said first indentations.

7. The storage media rack of claim 2, wherein said second partition walls do not align with said first partition walls.

8. The storage media rack of claim 1, wherein said front wall, said rear wall and said side walls each have a portion proximate corners of said walls having a larger thickness than a remaining portion of the respective one of said walls.

9. The storage media rack of claim 1, wherein said bottom wall includes an elongate aperture and a lip extending downward around said aperture.

10. A storage media rack arranged to simultaneously receive different sizes and types of storage media, comprising:

front and rear walls;
side walls;
a bottom wall having steps which connect said bottom wall to said side walls; and
partition walls projecting inwardly from said steps and upwardly from said bottom wall whereby a first type of storage media is positionable on said steps and a second type of storage media is positionable on said bottom wall between said steps.

11. The storage media rack of claim 10, wherein said partition walls include side faces having indentations spaced a distance from said bottom wall and from a vertical leg of said steps such that additional types of storage media are positionable on said indentations.

12. The storage media rack of claim 10, wherein said partition walls include side faces having a first indentation spaced a first distance from said bottom wall and from a vertical leg of said steps and a second indentation spaced a second, larger distance from said bottom wall and said vertical leg such that additional types of storage media are positionable on said indentations.

13. The storage media rack of claim 12, further comprising a bi-level platform alongside each side of each of said partition walls and alongside an inner face of said front and rear walls.

14. The storage media rack of claim 13, wherein for each of said platforms, a lower level of said platform and a vertical riser between the two levels aligns with a respective one of said first indentations.

15. A storage media rack arranged to simultaneously receive different sizes and types of storage media, comprising:
front and rear walls;
side walls;
a bottom wall having steps which connect said bottom wall to said side walls; and
first partition means for partitioning areas above said steps whereby a first type of storage media is positionable on said steps and a second type of storage media is positionable on said bottom wall between said steps.

16. The storage media rack of claim 15, wherein said first partition means comprise partition walls arranged perpendicular to said side walls and on said steps.

17. The storage media rack of claim 15, further comprising second partition means for partitioning an area between said steps.

18. The storage media rack of claim 17, wherein said second partition means comprise partition walls projecting inwardly from said steps and upwardly from said bottom wall.

19. The storage media rack of claim 18, wherein said partition walls include side faces having indentations spaced a distance from said bottom wall and from a vertical leg of said steps such that additional types of storage media are positionable on said indentations.

20. The storage media rack of claim 19, further comprising a bi-level platform alongside each side of each of said partition walls and alongside an inner face of said front and rear walls.

21. A storage media rack arranged to simultaneously receive different sizes and types of storage media, comprising:
front and rear walls;
side walls;
a bottom wall having steps which connect said bottom wall to said side walls; and
first partition means for partitioning an area between said steps whereby a first type of storage media is positionable on said steps and a second type of storage media is positionable on said bottom wall between said steps.

22. The storage media rack of claim 21, wherein said first partition means comprise partition walls projecting inwardly from said steps and upwardly from said bottom wall.

23. The storage media rack of claim 22, wherein said partition walls include side faces having indentations spaced a distance from said bottom wall and from a vertical leg of said steps such that additional types of storage media are positionable on said indentations.

24. The storage media rack of claim 22, wherein said partition walls include side faces having a first indentation spaced a first distance from said bottom wall and from a vertical leg of said steps and a second indentation spaced a second, larger distance from said bottom wall and said vertical leg such that additional types of storage media are positionable on said indentations.

25. The storage media rack of claim 24, further comprising a bi-level platform alongside each side of each of said partition walls and alongside an inner face of said front and rear walls.

* * * * *